US012738223B2

(12) United States Patent
Wang et al.

(10) Patent No.: US 12,738,223 B2
(45) Date of Patent: Sep. 15, 2026

(54) PIXEL DRIVING CIRCUIT, CONTROL METHOD FOR PIXEL DRIVING CIRCUIT, AND DISPLAY PANEL

(71) Applicant: Wuhan Tianma Microelectronics Co., Ltd., Wuhan (CN)

(72) Inventors: Lanlan Wang, Wuhan (CN); Yanyun Fan, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 19/193,945

(22) Filed: Apr. 29, 2025

(65) Prior Publication Data

US 2026/0253541 A1 Aug. 27, 2026

(30) Foreign Application Priority Data

Feb. 21, 2025 (CN) ........................ 202510199798.5

(51) Int. Cl.
*G09G 3/30* (2006.01)
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2300/0842* (2013.01); *G09G 2300/0861* (2013.01); *G09G 2310/061* (2013.01); *G09G 2310/08* (2013.01); *G09G 2320/0233* (2013.01); *G09G 2320/045* (2013.01); *G09G 2330/021* (2013.01)

(58) Field of Classification Search
None
See application file for complete search history.

(56) References Cited

U.S. PATENT DOCUMENTS 12,494,161 B1 * 12/2025 Lai ........................... G09G 3/32
2023/0274688 A1 * 8/2023 Cao .......................... G09G 3/32
345/55

(Continued)

FOREIGN PATENT DOCUMENTS

CN 107452339 A 12/2017
CN 108922474 A 11/2018

(Continued)

OTHER PUBLICATIONS

The First Office Action for Chinese Application No. 202510199798.5, dated Aug. 27, 2025, 15 pages.

*Primary Examiner* — Joseph R Haley
(74) *Attorney, Agent, or Firm* — East IP P.C.

(57) ABSTRACT

A pixel driving circuit, a control method for the pixel driving circuit, and a display panel are provided in the present application. The pixel driving circuit includes a driving module, a reset module, a data writing module and a light-emitting control module. The data writing module is connected to a first end of the driving module at a first node, the data writing module comprises a first data writing unit and a second data writing unit, the first data writing unit is configured to write a predetermined amplitude voltage signal to the first node in a bias stage, and the second data writing unit is configured to write a data signal to the first node in a data writing stage; a second end of the driving module is connected to the reset module at a second node.

14 Claims, 13 Drawing Sheets

(56) References Cited

U.S. PATENT DOCUMENTS

| | | | | |
|---|---|---|---|---|
| 2024/0074237 | A1* | 2/2024 | Wang | H10K 59/352 |
| 2024/0257753 | A1 | 8/2024 | Zhang | |

FOREIGN PATENT DOCUMENTS

| | | | |
|---|---|---|---|
| CN | 113012643 | A | 6/2021 |
| CN | 114220389 | A | 3/2022 |
| CN | 115050331 | A | 9/2022 |

* cited by examiner

--Prior Art--

--Prior Art--

--Prior Art--

--Prior Art--

--Prior Art--

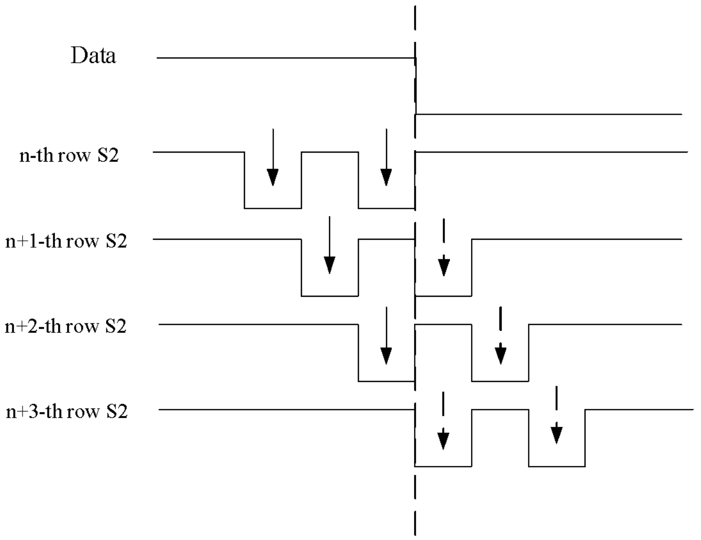
(A)
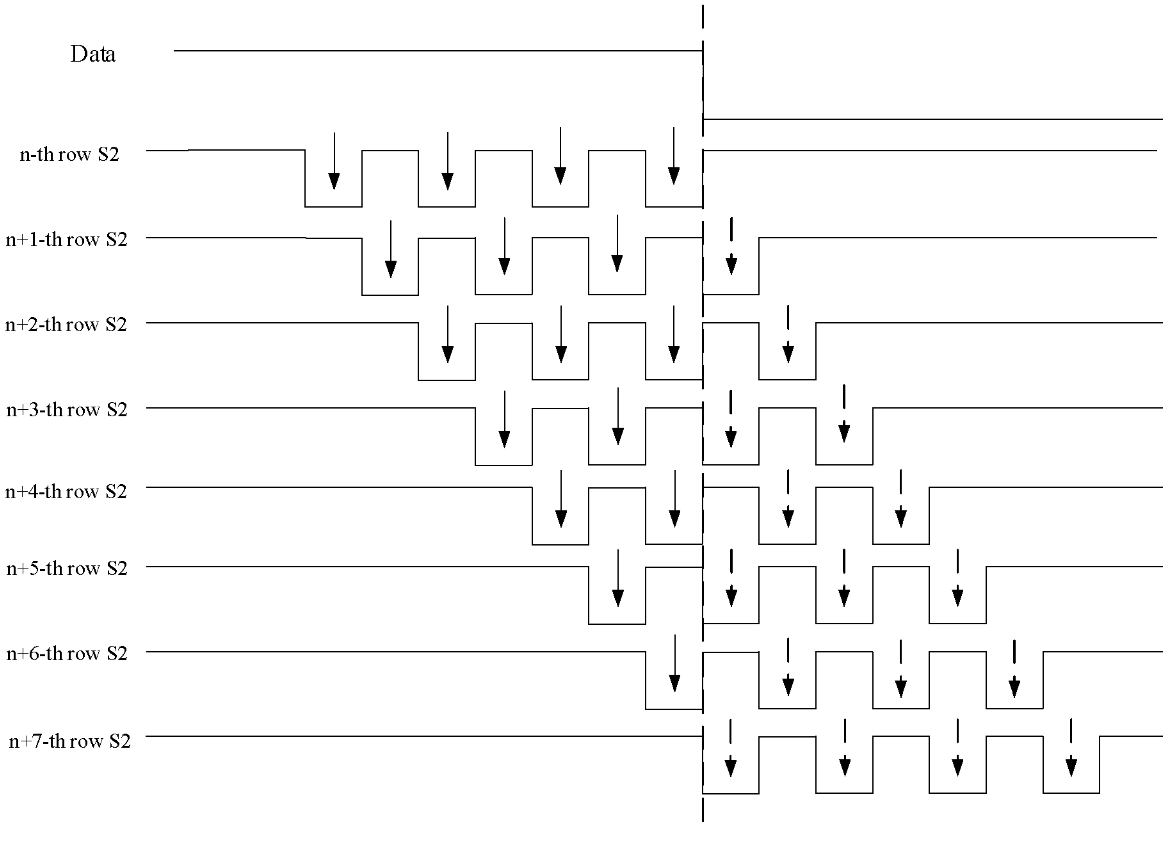
(B)
--Prior Art--
FIG. 6

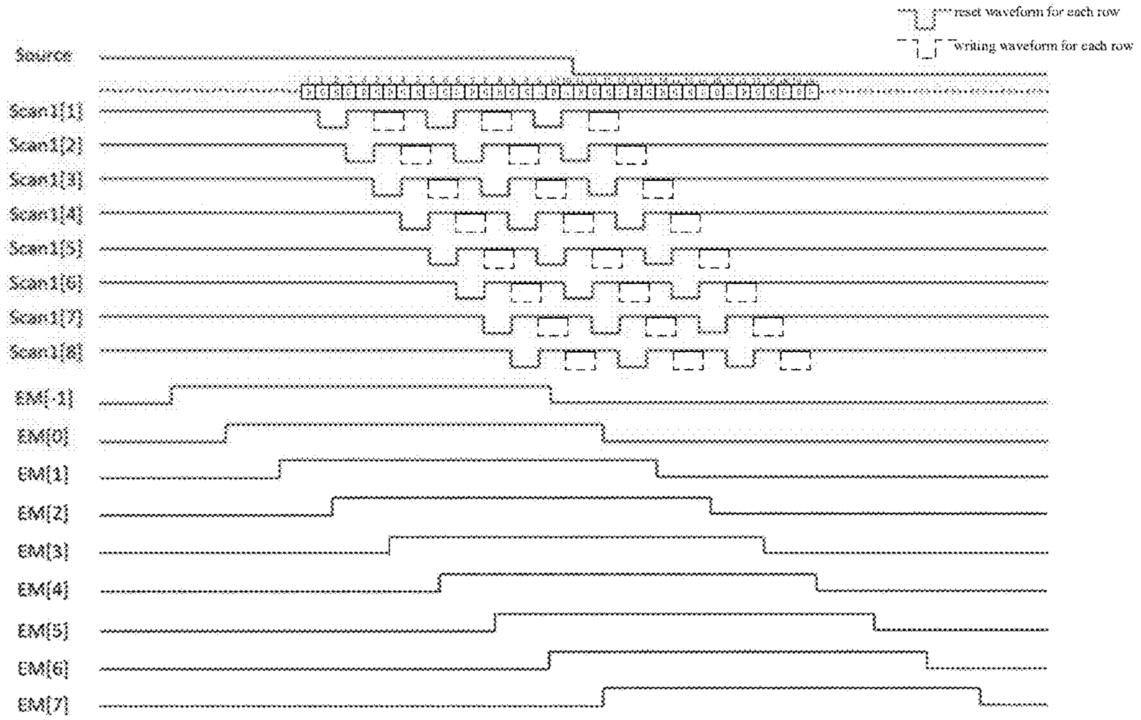

FIG. 13

When the pixel driving circuit is in the bias stage, the light-emitting control module 40 and the second data writing unit 32 are controlled to be turned off, and the first data writing unit 31 is controlled to be turned on to write the predetermined amplitude voltage signal into the first node N1. After the predetermined amplitude voltage signal is written into the first node N1, the first data writing unit 31 is controlled to be turned off and the second data writing unit 32 is controlled to be turned on, so as to control the pixel driving circuit to enter the data writing stage

S101

FIG. 14

PIXEL DRIVING CIRCUIT, CONTROL METHOD FOR PIXEL DRIVING CIRCUIT, AND DISPLAY PANEL

CROSS-REFERENCE TO RELATED APPLICATIONS

This application claims priority to Chinese Patent Application No. 202510199798.5, titled "PIXEL DRIVING CIRCUIT, CONTROL METHOD FOR PIXEL DRIVING CIRCUIT, AND DISPLAY PANEL" and filed on Feb. 21, 2025, which is hereby incorporated by reference in its entirety.

TECHNICAL FIELD

The present application relates to the field of display technology, and in particular to a pixel driving circuit, a control method for the pixel driving circuit, and a display panel.

BACKGROUND

Existing small and medium-sized display screen products use the Ramless+DDL+VSR 4CK design to reduce costs and improve problems such as high-frequency, high-resolution, low-grayscale uniformity and IC power consumption, wherein the term "Ramless+DDL+VSR 4CK" describes a specific driving architecture and operating mode in AMOLED (active matrix organic light-emitting diode) display panels. Its components have the following meanings.

In AMOLED display, Ramless refers to a design that reduces the demand for the number of sources inside the driver IC by adding a demux circuit (demultiplexing circuit), thereby reducing costs. The demux circuit is a digital circuit for distributing an input signal to one of multiple output signals. It usually consists of an input end and multiple output ends. According to the control signal of the input end, the input signal is routed to the corresponding output end. Source refers to the signal that provides data voltage (driving voltage) to the panel;

DDL (Dual Data Line) refers to dual data line design. Dual data line design means that in the source driving circuit of the display panel, each pixel column is equipped with two data lines;

VSR (Variable Shift Register) refers to a shift register;

4CK: CK here usually refers to the clock signal or control signal, and "4CK" means that four clock signals are used to control the writing and refreshing of pixels.

Ramless+DDL+VSR 4CK is designed to increase the writing speed of AMOLED (active matrix organic light-emitting diode) display screens, reduce power consumption, and improve display quality, especially for high-resolution and low-cost application scenarios. However, this design may also bring some side effects.

SUMMARY

The main purpose of the present application is to provide a pixel driving circuit, a control method for the pixel driving circuit, and a display panel, so as to at least solve the problem of light emission occurred below black fonts in the display panel in the related art.

In order to achieve the above-mentioned purpose, according to one aspect of the present application, a pixel driving circuit is provided, including a driving module, a reset module, a data writing module and a light-emitting control module, wherein the data writing module is connected to a first end of the driving module at a first node, the data writing module includes a first data writing unit and a second data writing unit, the first data writing unit is configured to write a predetermined amplitude voltage signal to the first node in the bias stage, and the second data writing unit is configured to write a data signal to the first node in the data writing stage; the second end of the driving module is connected to the reset module at a second node, and the reset module is configured to reset the second node and an anode of the light-emitting element.

According to another aspect of the present application, based on the same inventive concept, a control method for the pixel driving circuit is provided, the control method is configured to control the pixel driving circuit comprising a driving module, a reset module, a data writing module and a light-emitting control module, the data writing module being connected to a first end of the driving module at a first node, the data writing module comprising a first data writing unit and a second data writing unit, the first data writing unit being configured to write a predetermined amplitude voltage signal to the first node in a bias stage, and the second data writing unit being configured to write a data signal to the first node in a data writing stage; a second end of the driving module being connected to the reset module at a second node, and the reset module being configured to reset the second node and an anode of the light-emitting element, the method comprising: in a case that the pixel driving circuit is in the bias stage, controlling the light-emitting control module and the second data writing unit to be turned off, and controlling the first data writing unit to be turned on to write the predetermined amplitude voltage signal to the first node, and after writing the predetermined amplitude voltage signal to the first node, controlling the first data writing unit to be turned off and the second data writing unit to be turned on, so as to control the pixel driving circuit to enter the data writing stage.

According to another aspect of the present application, based on the same inventive concept, a display panel is provided, comprising: the pixel driving circuit comprising a driving module, a reset module, a data writing module and a light-emitting control module, the data writing module being connected to a first end of the driving module at a first node, the data writing module comprising a first data writing unit and a second data writing unit, the first data writing unit being configured to write a predetermined amplitude voltage signal to the first node in a bias stage, and the second data writing unit being configured to write a data signal to the first node in a data writing stage; a second end of the driving module being connected to the reset module at a second node, and the reset module being configured to reset the second node and an anode of the light-emitting element.

BRIEF DESCRIPTION OF THE DRAWINGS

The drawings in the specification that constitute parts of the present application are used to provide further understanding of the present application. The schematic embodiments of the present application and their description are used to explain the present application and do not constitute improper limitations on the present application. In the drawings:

FIG. 6 shows a timing sequence diagram of a second scanning signal and a data signal of parts of areas of the display panel under a two-pulse signal and a four-pulse signal in the related art;

FIG. 13 shows a timing sequence diagram of pixel driving circuits at multiple rows under a three-pulse signal provided in an embodiment of the present application;

FIG. 14 shows a flowchart of a control method for the driving circuit provided in an embodiment of the present application.

REFERENCE NUMERALS

Figure 1:
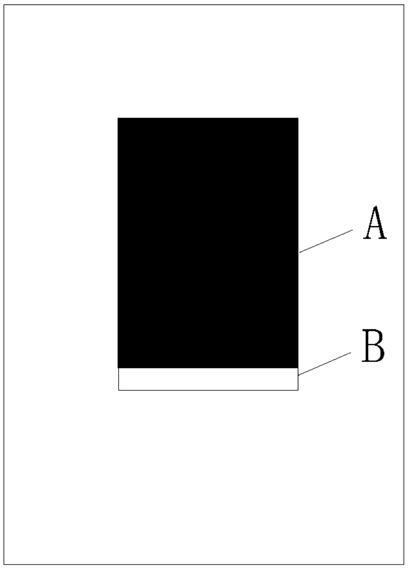
FIG. 1 shows a schematic diagram of a light emission phenomenon occurred below a black display area of the display panel in the related art.

10, driving module; 20, reset module; 21, reset submodule; 30, data writing module; 31, first data writing unit; 32, second data writing unit; 40, light-emitting control module; 50, threshold compensation module; PD1, light-emitting element; M1, first data writing transistor; M2, second data writing transistor; M3, third data writing transistor; M4, fourth data writing transistor; M5, first dual-gate transistor; M51, first transistor; M52, second transistor; M6, reset transistor; M7, second dual-gate transistor; M71, third transistor; M72, fourth transistor; M8, driving transistor; M9, first light-emitting control transistor; M10, second light-emitting control transistor; C, storage capacitor; N1, first node; N2, second node; DVH, predetermined amplitude voltage signal; Vdata, data signal; EM1, first data writing control signal; EM2, second data writing control signal; EM3, light-emitting control signal; Scan1, the second scanning signal; Scan2, the first scanning signal.

DETAILED DESCRIPTION

It should be noted that, in the absence of conflict, the embodiments and features in the embodiments of the present application can be combined with each other. The present application will be described in detail below with reference to the drawings and in combination with the embodiments.

In order to enable those skilled in the art to better understand the present application scheme, the technical scheme in the embodiments of the present application will be clearly and completely described below in combination with the drawings in the embodiments of the present application. Apparently, the described embodiments are only some embodiments of the present application, rather than all embodiments. Based on the embodiments in the present application, all other embodiments obtained by those skilled in the art without making creative work should fall within the protection scope in the present application.

It should be noted that the terms "first", "second", etc. in the specification and claims of the present application and the above-mentioned drawings are used to distinguish similar objects, and are not necessarily used to describe a specific order or sequence. It should be understood that the data used in such way can be interchanged where appropriate, so as to describe the embodiments of the present application described here. In addition, the terms "including" and "having" and any variations thereof are intended to cover non-exclusive inclusions, for example, a process, method, system, product or device comprising a series of steps or units need not be limited to those steps or units clearly listed, but may include other steps or units that are not clearly listed or inherent to these processes, methods, products or devices.

As introduced in the background technology, in the design of the shift register of the related art controlled by 4 clock signals, the data writing process is divided into multiple pulses, so before the data is formally written, a series of pre-writing or virtual writing steps can be performed to reduce power consumption and improve the stability of data writing.

DTFT NBS negative bias refers to the phenomenon that in an OLED display panel, when a transistor (usually a thin film transistor, TFT) is subjected to a negative bias voltage for a long time, its threshold voltage (Threshold Voltage) may shift. Here, DTFT (Driver TFT) refers to the driving transistor in the pixel driving circuit, and NBS (Negative Bias Stress) refers to the negative voltage bias stress applied to the TFT.

FIG. 1 is a schematic diagram of a light emission phenomenon occurred below a black display area of a display panel in the related art. As shown in FIG. 1, during the reset/virtual writing process of the edge row below the black display area in the display panel, the DTFT NBS of the reset module of the pixel driving circuit of the edge row below the black display area is more negatively biased, which may cause insufficient data voltage writing of the gate of the driving transistor. When the data is insufficiently written, the OLED pixel may emit a brightness different from the expected brightness in the subsequent light-emitting stage due to insufficient driving current, which is represented as a bright line or light emission phenomenon, that is, as shown in FIG. 1, area A is a black display area, and area B is a bright line or light emission area below the black display area, wherein the black display area can have black fonts.

Figure 2:
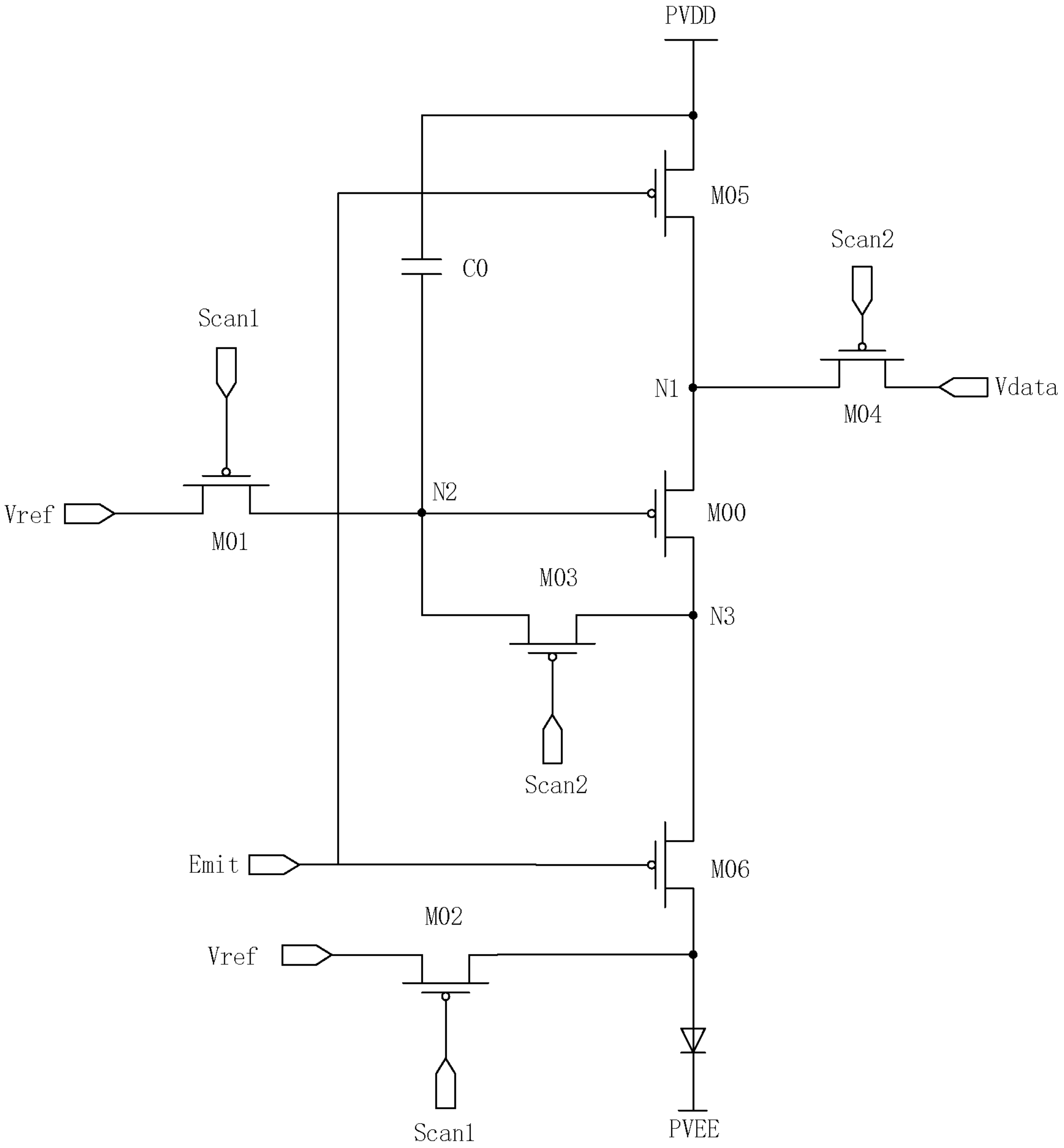
FIG. 2 shows a schematic structural diagram of a pixel driving circuit of the display panel in the related art.

FIG. 2 is a schematic structural diagram of a pixel driving circuit of a display panel in the related art. As shown in FIG. 2, the pixel driving circuit includes a first reset transistor M01, a second reset transistor M02, a threshold compensation transistor M03, a data writing transistor M04, a first light-emitting control transistor M05, a second light-emitting control transistor M06, a driving transistor M00 and a capacitor C0, wherein the first reset transistor M01 is configured to be turned on under the control of the second scanning signal Scan1 and transmit the reset signal Vref to the second node N2, the second reset transistor M02 is configured to be turned on under the control of the second scanning signal Scan1 and transmit the reset signal Vref to the anode of the light-emitting element, the threshold compensation transistor M03 and the data writing transistor M04 are configured to write the data signal Vdata to the second node N2 under the control of the first scanning signal Scan2, the first light-emitting control transistor M05 and the second light-emitting control transistor M06 are configured to be turned on under the control of the data writing control signal Emit to transmit the signal of the first driving power line PVDD to the anode of the light-emitting element for controlling the light-emitting element to emit light, and the driving transistor M00 is configured to be turned on under the control of the voltage of the second node N2 to drive the light-emitting element to emit light.

As shown in FIG. 2, each row in the display panel has a corresponding pixel driving circuit driving the pixels at the row for displaying. In the embodiments, the n-th row is the last row of the black display area of the display panel (i.e., the last row of area A in FIG. 1), and the n+1-th row, . . . , and the n+4-th row are the last four rows starting from the n-th row respectively and are the light emission areas below the black display area, i.e., the n+1-th row, . . . , and the n+4-th row are all located in area B in FIG. 1, and the n+5-th row and the n+6-th row are the normal display areas below the light emission areas (i.e., the normal display areas below area B in FIG. 1).

Figure 3:
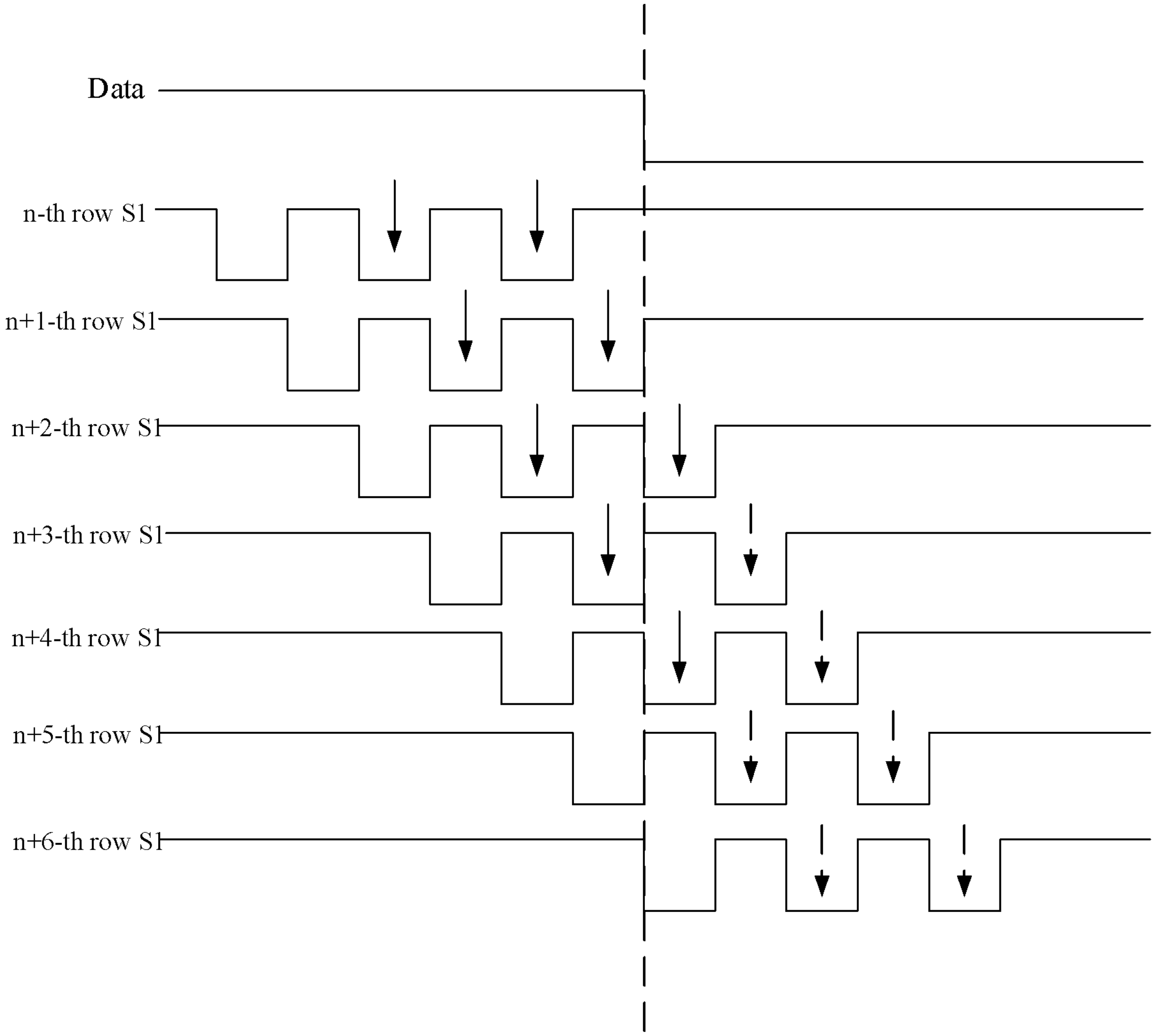
FIG. 3 shows a timing sequence diagram of a first scanning signal and a data signal of part of areas of the display panel under a three-pulse signal in the related art.
Figure 4:
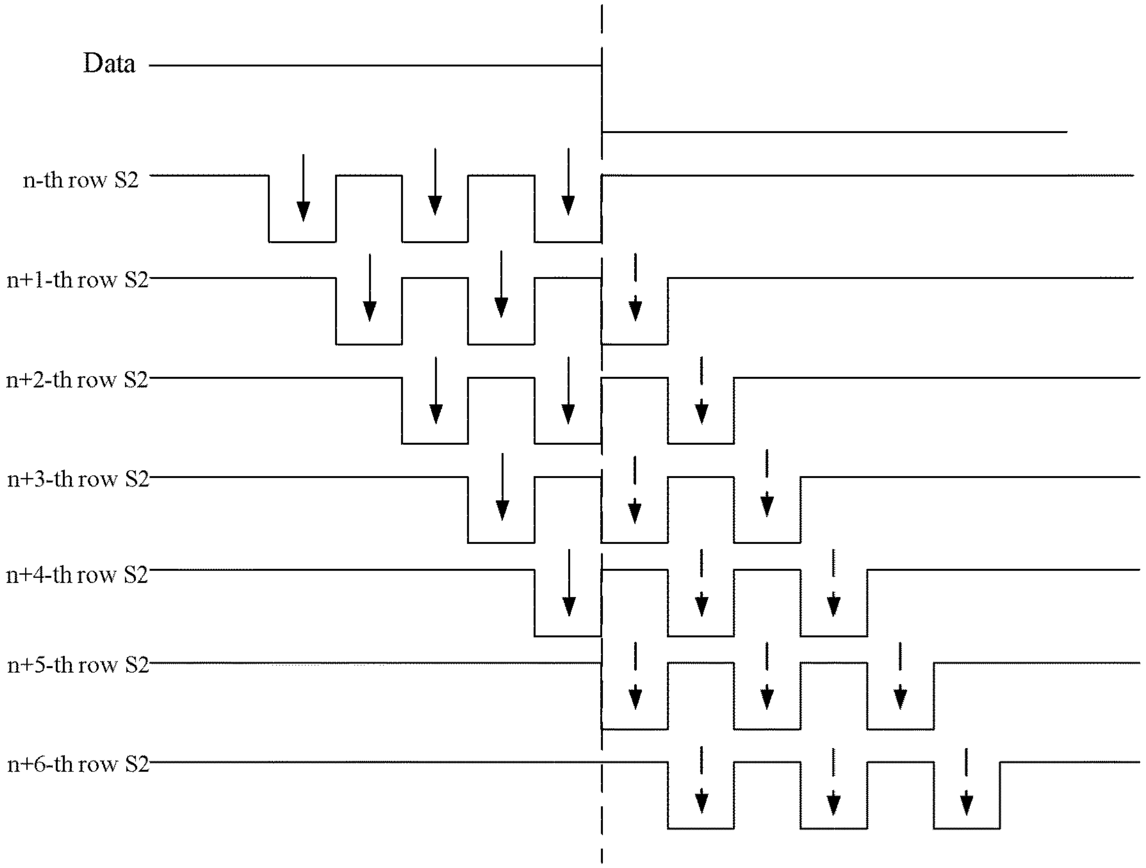
FIG. 4 shows a timing sequence diagram of a second scanning signal and a data signal of parts of areas of the display panel under the three-pulse signal in the related art.

FIG. 3 is a timing sequence diagram of the first scanning signal and the data signal of parts of areas in the display panel under the three-pulse signal in the related art, and FIG. 4 is a timing sequence diagram of the second scanning signal and the data signal of parts of areas in the display panel under the three-pulse signal in the related art. As shown in FIG. 2 and FIG. 3, the n-th row S1 is the second scanning signal Scan1 of pixel driving circuit at the n-th row, and the n+1-th row S1, . . . , and the n+6-th row S1 are the second scanning signal Scan1 of the pixel driving circuit at the n+1-th row, . . . , and the second scanning signal Scan1 of the pixel driving circuit at the n+6-th row respectively; as shown in FIG. 2 and FIG. 4, the n-th row S2 is the first scanning signal Scan2 of the pixel driving circuit at the n-th row, and the n+1-th row S2, . . . , and the n+6-th row S2 are the first scanning signal Scan2 of the pixel driving circuit at the n+1-th row, . . . , and the first scanning signal Scan2 of the pixel driving circuit at the n+6-th row respectively. Data is the data signal of the display panel. As shown in FIG. 3 and FIG. 4, the data signal Data in the black display area of the display panel is a relatively high voltage signal (for example: 6.6V). Under normal circumstances, the data signal Data in the normal display area below the black display area of the display panel is a relatively low voltage signal (for example: 3V), and the n-th row is the last row of the black display area of the display panel. Therefore, after the data signal Data is written into the n-th row of the display panel, the data signal Data changes from a high voltage signal (6.6V) to a low voltage signal (3V). That is, after the last pulse of n-th row S2 of the display panel ends, the data signal Data changes from a high voltage signal (6.6V) to a low voltage signal (3V).

Since the scanning signal of the display panel in this solution is a three-pulse signal, the first two pulse times of S2 of the pixel driving circuits of the n+1-th to n+4-th rows are the virtual writing periods (i.e. bias stage) of the pixel driving circuits, and in the virtual writing periods (i.e. bias stage) of the pixel driving circuits of the n+1-th to n+4-th rows, the data signal Data is still in the state of a high voltage signal (6.6V), that is, the voltage virtually written by the pixel driving circuits of the n+1-th to n+4-th rows is a high voltage signal (6.6V), and the written real Data voltage required for the pixel to emit light is a low voltage signal (3V).

As shown in FIG. 3 and FIG. 4, the solid arrow indicates that the voltage written into the first node N1 of the pixel driving circuit is 6.6V, and the dotted arrow indicates that the voltage written into the first node N1 of the pixel driving circuit is 3V. Since S2 is a signal for controlling data writing in the pixel driving circuit, when S2 is the first two low-level pulses, S2 is in the bias stage of the pixel driving circuit, and the Vdata voltage is virtually written into the driving transistor M0 in FIG. 2. When S2 is the third low-level pulse, S2 is in the real data writing stage of the pixel driving circuit, and the real required Vdata voltage is written into the driving transistor M0 in FIG. 2. As can be seen from the timing sequence diagrams of FIG. 3 and FIG. 4, the timing sequences of S1 and S2 in the pixel driving circuit are different, and data is written only when S2 is at a low level. Therefore, the Vdata voltage is not written into the driving transistor M0 in FIG. 2 when S1 in the pixel driving circuit is at the first pulse, and the Vdata voltage is written into the driving transistor M0 in FIG. 2 only when S1 is at the last two pulses.

Since the Vdata voltages written into the driving transistor M0 in FIG. 2 during the bias stage and data writing stage of the pixel driving circuits at the n+1-th row to the n+4-th row are different, that is, the voltage of the first node N1 of the pixel driving circuits of the n+1-th row to the n+4-th row is written insufficiently, resulting in the problem of light emission in the area of the n+1-th row to the n+4-th row. The Vdata voltages written into the driving transistor M0 in FIG. 2 during the bias stage and data writing stage of the pixel driving circuits after the n+5-th row are the same, so the display panel starts to display normally after the n+5-th row.

Furthermore, as shown in FIG. 4, it can been seen that the high-level signal (6.6V) of the Vdata virtually written into the pixel driving circuits of the n+1-th row and the n+2-th row has a longer time, so the brightness of the n+1-th row and the n+2-th row in the display panel is brighter.

Figure 5:
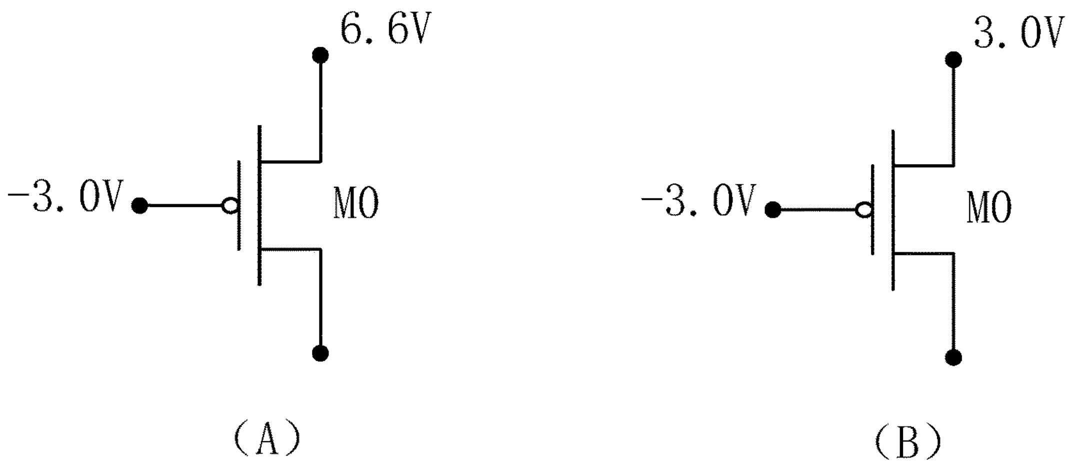
FIG. 5 shows a comparison diagram of voltages at respective ends of driving transistors of the pixel driving circuits of parts of areas of the display panel in the related art.

FIG. 5 is a comparison diagram of the voltages at the respective ends of the driving transistors of the pixel driving circuits of parts of areas in the display panel in the related art. FIG. 5 (A) is a schematic diagram of the voltages at the respective ends of the driving transistor when the pixel driving circuit is input with the data voltage Data represented by the solid arrow in FIG. 3. As shown in FIG. 5 (A), the voltage of the gate of the driving transistor is-3.0V. When the high voltage (6.6V) data signal Data is written into the pixel driving circuit, the voltage of the source of the driving transistor is 6.6V, that is, the gate-source voltage difference of the driving transistor is-9.6V; FIG. 5 (B) is a schematic diagram of the voltages at the respective ends of the driving transistor when the pixel driving circuit is input with the data voltage Data represented by the dotted arrow in FIG. 3. As shown in FIG. 5 (B), the voltage of the gate of the driving transistor is-3.0V. When the low voltage (3V) data signal Data is written into the pixel driving circuit, the voltage of the source of the driving transistor is 3V, that is, the gate-source voltage difference of the driving transistor is-6V.

It should be noted that in some cases, the driving transistor can be an n-type transistor or a P-type transistor. In the present application, the driving transistor is a P-type transistor as an example, and the low level is used as the enable level in the present application, that is, when the scanning signal is at a low level, the data signal is written.

In addition, in the present application, a three-pulse signal is taken as an example. As shown in FIG. 3, when the scanning signal is a three-pulse signal, the number of rows of light emission affected below the black display area is 4. In some cases, the number of pulses of the signal of the pixel driving circuit are not the same, so the number of rows of light emission affected below the black display area may be different. FIG. 6 is a timing sequence diagram of the second scanning signal and data signal of parts of areas in the display panel under two-pulse signal and four-pulse signal in the related art, FIG. 6 (A) is a timing sequence diagram of the second scanning signal and data signal of parts of areas in the display panel under two-pulse signal in the related art, and FIG. 6 (B) is a timing sequence diagram of the second scanning signal and data signal of parts of areas in the display panel under four-pulse signal in the related art. As shown in FIG. 6 (A), the signal of the pixel driving circuit is a two-pulse signal, and the number of rows of light emission affected below the black display area is 2. As shown in FIG. 6 (B), the signal of the pixel driving circuit is a four-pulse signal, and the number of rows of light emission affected below the black display area is 6, that is, the more pulses of the signal, the more rows are affected, and the wider the bright line.

In order to solve the problem of light emission below black fonts in the display panel in the related art, a pixel driving circuit, a control method for the pixel driving circuit, and a display panel are provided in the embodiments of the present application.

The technical solutions in the embodiments of the present application will be described clearly and completely below in conjunction with the drawings in the embodiments of the present application.

Figure 7:
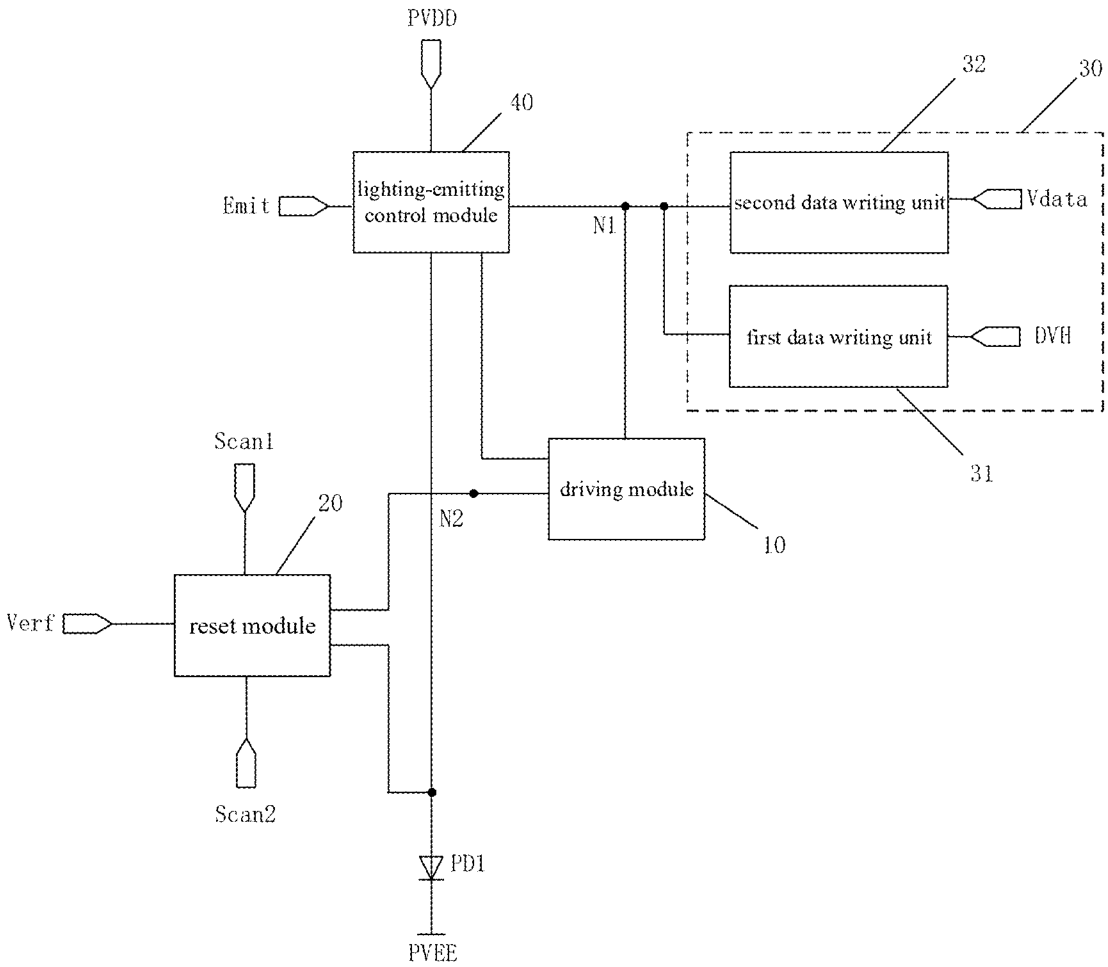
FIG. 7 shows a schematic structural diagram of a pixel driving circuit provided in an embodiment of the present application.

In the present embodiment, a pixel driving circuit is provided. FIG. 7 is a schematic structural diagram of a pixel driving circuit provided in the embodiments of the present application. As shown in FIG. 7, the pixel driving circuit includes a driving module 10, a reset module 20, a data writing module 30 and a light-emitting control module 40, wherein the data writing module 30 is connected to the first end of the driving module 10 at the first node N1, and the data writing module 30 includes a first data writing unit 31 and a second data writing unit 32. The first data writing unit 31 is configured to write a predetermined amplitude voltage signal to the first node in the bias stage, and the second data writing unit 32 is configured to write a data signal to the first node N1 in the data writing stage; the second end of the driving module 10 is connected to the reset module 20 at the second node N2, and the reset module 20 is configured to reset the second node N2 and the anode of the light-emitting element PD1.

The driving module 10 is configured to drive the light-emitting element PD1 to emit light. The reset module 20 is configured to provide the reset signal Verf to the second node N2 under the control of the first scanning signal Scan2 to reset the second node N2, and to provide the reset signal Verf to the anode of the light-emitting element PD1 under the control of the second scanning signal Scan1 to reset the anode of the light-emitting element PD1. The light-emitting control module 40 is configured to provide the signal of the first driving power line PVDD to the light-emitting element PD1 under the control of the light-emitting control signal EM3, so as to control the light-emitting time of the light-emitting element PD1.

The reset module 20 is first controlled to be turned on in the reset stage to reset the second node N2 and the anode of the light-emitting element PD1, and then the first data writing unit 31 is controlled to be turned on and the second data writing unit 32 is controlled to be turned off in the bias stage (i.e., the virtual writing stage) to write the predetermined amplitude voltage signal DVH to the first node N1, wherein the predetermined amplitude voltage signals DVH of all pixel driving circuits on the display panel are the same, so that the voltages virtually written into the first node N1 of all pixel driving circuits on the display panel are the same, and the bias states of the transistors are the same, which avoids the problem of the light emission phenomenon occurred below the black part of display panel caused by the black part and the white part of the display panel having different voltage signals written in the bias stage (i.e., the virtual writing stage). That is, when the voltages virtually written into the first node N1 of all pixel driving circuits on the display panel are the same, in the data writing stage, the first data writing unit is turned off and the second data writing unit is turned on, and each pixel driving circuit writes the real data voltage required for the corresponding pixel to emit light, which may not be affected by the inconsistency of the virtual voltage writing, and the corresponding row of each pixel driving circuit displays the corresponding normal brightness.

The above-mentioned pixel driving circuit of the present application includes a driving module, a reset module, a data writing module and a light-emitting control module. The data writing module and the first end of the driving module are connected at a first node. The data writing module includes a first data writing unit and a second data writing unit. The first data writing unit is configured to write a predetermined amplitude voltage signal to the first node in the bias stage, and the second data writing unit is configured to write a data signal to the first node in the data writing stage. The second end of the driving module is connected to the reset module at the second node. The pixel driving circuit controls all pixels to be written with the same predetermined amplitude voltage signal in the bias stage through the first data writing module and the second data writing module, so that all pixels have the same virtual writing state, thereby eliminating the light emission phenomenon occurred below the black fonts, and solving the problem of light emission occurred below the black fonts in the display panel in the related art.

Figure 8:
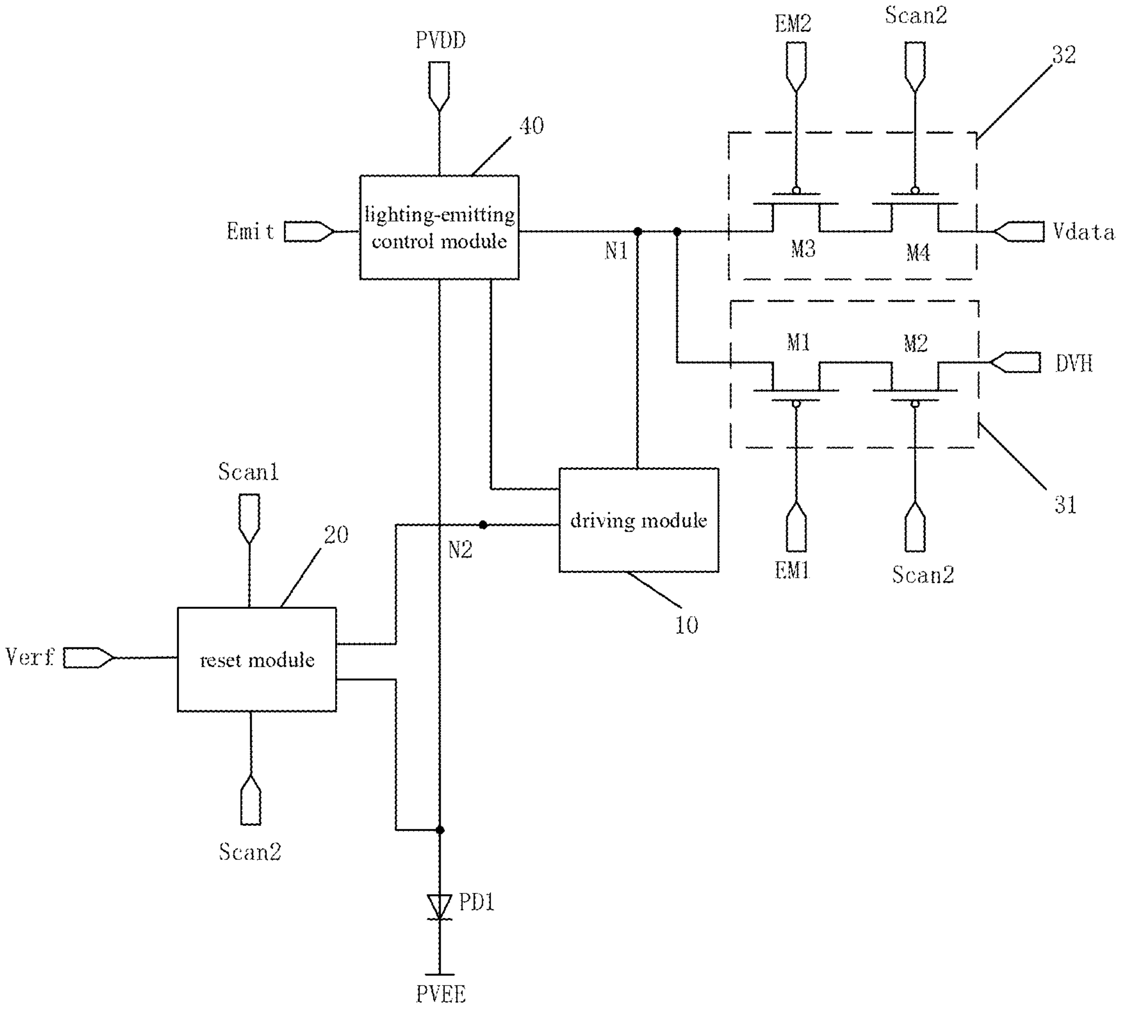
FIG. 8 shows a schematic structural diagram of another pixel driving circuit provided in an embodiment of the present application.

In some embodiments, as shown in FIG. 8, the first data writing unit 31 includes: a first data writing transistor M1, wherein a first electrode of the first data writing transistor M1 is electrically connected to the first node N1, and a gate of the first data writing transistor M1 is configured to input a first data writing control signal EM1; a second data writing transistor M2, wherein a first electrode of the second data writing transistor M2 is electrically connected to a second electrode of the first data writing transistor M1, a gate of the second data writing transistor M2 is configured to input a first scanning signal Scan2, and a second electrode of the second data writing transistor M2 is configured to input the predetermined amplitude voltage signal.

The first data writing control signal EM1 is configured to control the turn-on and turn-off of the first data writing transistor M1, and the first scanning signal Scan2 is configured to control the turn-on and turn-off of the second data writing transistor M2. In the present embodiment, the first data writing transistor M1 and the second data writing transistor M2 can be P-type transistors, that is, when the first data writing control signal EM1 is a low-level signal, the first data writing transistor M1 is turned on, when the first data writing control signal EM1 is a high-level signal, the first data writing transistor M1 is turned off, when the first scanning signal Scan2 is a low-level signal, the second data writing transistor M2 is turned on, when the first scanning signal Scan2 is a high-level signal, the second data writing transistor M2 is turned off.

Figure 12:
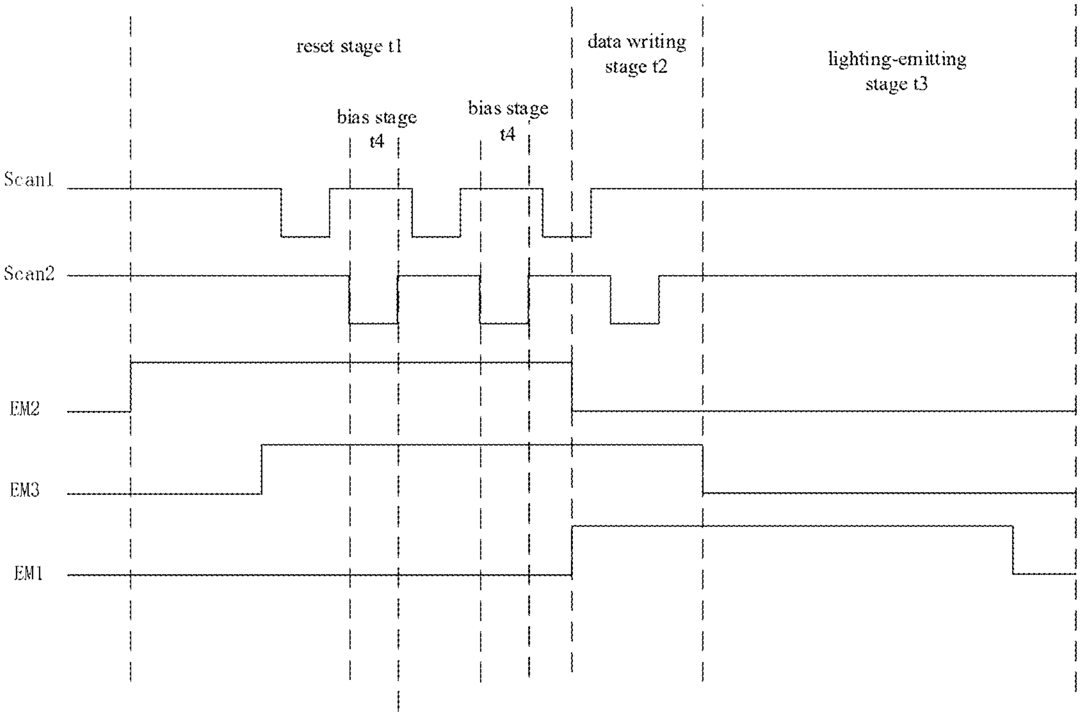
FIG. 12 shows a timing sequence diagram of the pixel driving circuit under a three-pulse signal provided in an embodiment of the present application.

FIG. 12 is a timing sequence diagram of a pixel driving circuit provided in an embodiment of the present application. As shown in FIG. 8 and FIG. 12, in the bias stage of the pixel driving circuit, the first data writing control signal EM1 is a low-level signal, controlling the first data writing transistor M1 to be turned on, and the second data writing control signal EM2 is a high-level signal, controlling the third data writing transistor M3 to be turned off. In the bias stage of the pixel driving circuit, when the second scanning signal Scan1 is a high-level signal and the first scanning signal Scan2 is a low-level signal, the first scanning signal Scan2 controls the second data writing transistor M2 to be turned on, so as to write the predetermined amplitude voltage signal DVH into the first node N1 through the second data writing transistor M2 and the first data writing transistor M1. Since the predetermined amplitude voltage signals DVH of all pixel driving circuits on the display panel are the same, the voltages virtually written into the first node N1 by all pixel driving circuits on the display panel are the same, and the bias states of the transistors are the same, which avoids the problem of the light emission phenomenon occurred below the black part of display panel caused by the black part and the white part of the display panel having different voltage signals written in the bias stage (i.e., the virtual writing stage). In addition, in the bias stage of the pixel driving circuit, the first scanning signal Scan2 is a low-level signal, which controls the fourth data writing transistor M4 to be turned on. However, since the second data writing control signal EM2 is a high-level signal at this time, the third data writing transistor M3 is turned off, so the data signal Vdata cannot be written into the first node N1 through the third data writing transistor M3. Therefore, in the bias stage (i.e., the virtual writing stage), the voltage of the first node N1 is not affected by the data signal Vdata.

FIG. 13 is a timing sequence diagram of a multi-row pixel driving circuit provided in an embodiment of the present application. As shown in FIG. 12 and FIG. 13, when the current pixel driving circuit is the pixel driving circuit at the n-th row, the first data writing control signal EM1 of the pixel driving circuit at the n-th row is the same as the light-emitting control signal EM3 of the pixel driving circuit at the n+5-th row. Therefore, in the display panel, the first data writing control signal EM1 of the pixel driving circuit at the n-th row and the light-emitting control signal EM3 of the pixel driving circuit at the n+5-th row can reuse the same signal.

As shown in FIG. 13, R is a pixel unit that emits red light, G is a pixel unit that emits green light, B is a pixel unit that emits blue light, and the Source signal is a signal that supplies power to the data signal Vdata. In the field of display technology, the signal output by the IC (Integrated Circuit) is transmitted to the data line of the display panel through a specific pin. The Source signal in the figure is responsible for transmitting information such as image data from the IC to the corresponding data line, providing power and data for it. For the display panel design of the present application, a Source signal can correspond to pixels in two adjacent columns in the same row, each of which has the label number corresponding to each pixel unit in FIG. 13, that is, the label number corresponding to each pixel unit in FIG. 13 is the row number in which the pixel is located in the display panel.

The solid line of Scan1[1] is the waveform of the second scanning signal of the pixel driving circuit at the n+1-th row on the display panel, the solid line of Scan1[2] is the waveform of the second scanning signal of the pixel driving circuit at the n+2-th row on the display panel, the solid line of Scan1[3] is the waveform of the second scanning signal of the pixel driving circuit at the n+3-th row on the display panel, . . . , the solid line of Scan1[8] is the waveform of the second scanning signal of the pixel driving circuit at the n+8-th row on the display panel, EM[−1] is the light-emitting control signal of the pixel driving circuit at the n−1-th row on the display panel, EM[0] is the light-emitting control signal of the pixel driving circuit at the n-th row on the display panel, . . . , EM[7] is the light-emitting control signal of the pixel driving circuit at the n−7-th row on the display panel, and the dotted line in FIG. 13 is the waveform of the first scanning signal of the corresponding row, and the pixel driving circuit at the n-th row is at the last row of the black area on the display panel.

In some embodiments, as shown in FIG. 8, the second data writing unit 32 includes: a third data writing transistor M3, wherein a first electrode of the third data writing transistor M3 is electrically connected to the first node N1, and a gate of the third data writing transistor M3 is configured to input a second data writing control signal EM2; and a fourth data writing transistor M4, wherein a first electrode of the fourth data writing transistor M4 is electrically connected to a second electrode of the third data writing transistor M3, a gate of the fourth data writing transistor M4 is configured to input a first scanning signal Scan2, and a second electrode of the fourth data writing transistor M4 is configured to input the data signal Vdata.

The second data writing control signal EM2 is configured to control the turn-on and turn-off of the third data writing transistor M3, and the first scanning signal Scan2 is configured to control the turn-on and turn-off of the fourth data writing transistor M4. In the present embodiment, the third data writing transistor M3 and the fourth data writing transistor M4 can be P-type transistors, that is, when the second data writing control signal EM2 is a low-level signal, the third data writing transistor M3 is turned on, when the second data writing control signal EM2 is a high-level signal, the third data writing transistor M3 is turned off, when the first scanning signal Scan2 is a low-level signal, the fourth data writing transistor M4 is turned on, when the first scanning signal Scan2 is a high-level signal, the fourth data writing transistor M4 is turned off.

As shown in FIG. 8 and FIG. 12, in the data writing stage of the pixel driving circuit, the first data writing control signal EM1 is a high-level signal, controlling the first data writing transistor M1 to be turned off, the second data writing control signal EM2 is a low-level signal, controlling the third data writing transistor M3 to be turned on, and the first scanning signal Scan2 changes from a high-level signal to a low-level signal, controlling the second data writing transistor M2 and the fourth data writing transistor M4 to be turned on, and the data signal Vdata is written into the first node N1 through the fourth data writing transistor M4 and the third data writing transistor M3. Since the first data writing transistor M1 is turned off, the predetermined amplitude voltage signal DVH cannot be written into the first node N1 through the first data writing transistor M1.

As shown in FIG. 12 and FIG. 13, in the case where the current pixel driving circuit is the pixel driving circuit at the n-th row, the second data writing control signal EM2 of the pixel driving circuit at the n-th row is the same as the light-emitting control signal EM3 of the pixel driving circuit at the n−2-th row. Therefore, in the display panel, the first data writing control signal EM1 of the pixel driving circuit at the n-th row and the light-emitting control signal EM3 of the pixel driving circuit at the n−2-th row can reuse the same signal.

Figure 9:
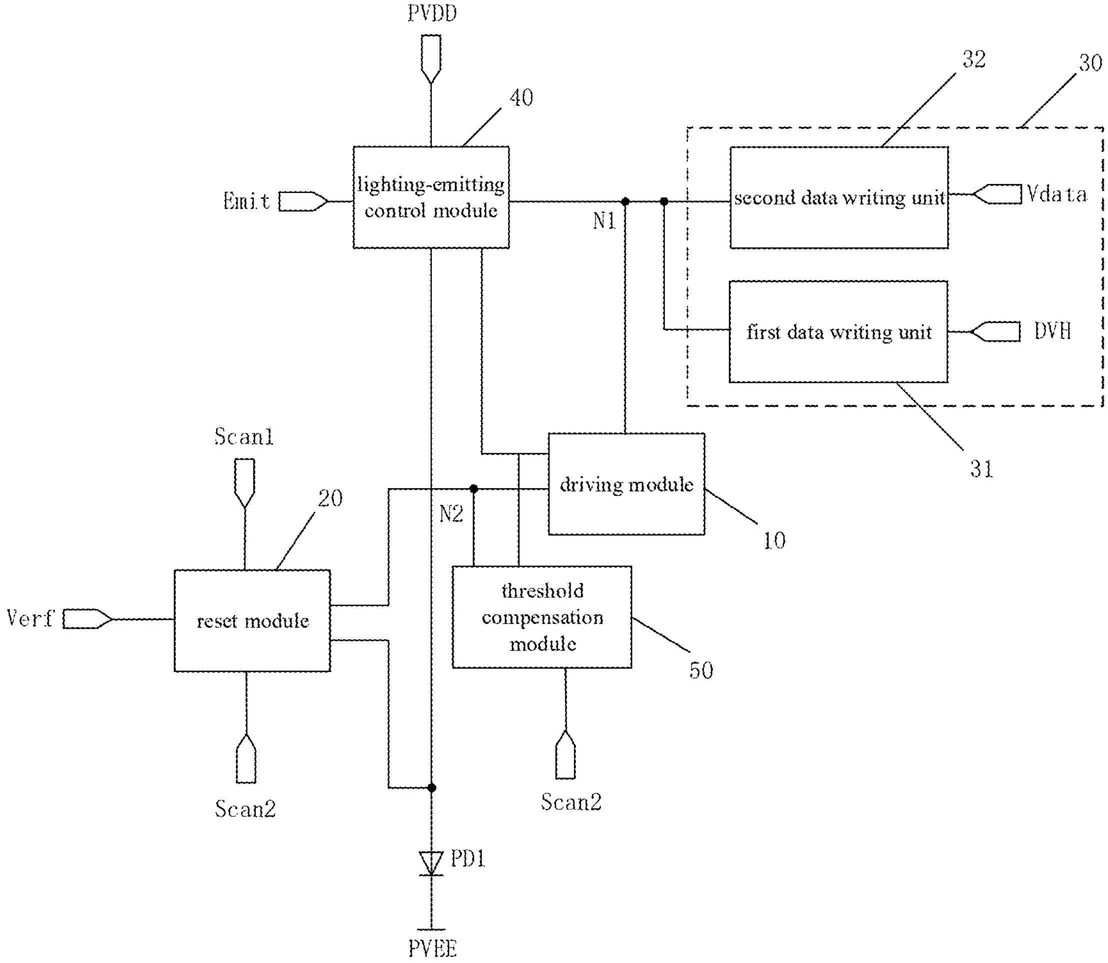
FIG. 9 shows a schematic structural diagram of another pixel driving circuit provided in an embodiment of the present application.

In some embodiments, as shown in FIG. 9, the pixel driving circuit further includes: a threshold compensation module 50, the first end of the threshold compensation module 50 is electrically connected to the third end of the driving module 10, the second end of the threshold compensation module 50 is electrically connected to the second node N2, and the third end of the threshold compensation module 50 is configured to input the first scanning signal Scan2.

The threshold compensation module 50 is configured to perform threshold compensation on the driving module under the control of the first scanning signal Scan2.

In some embodiments, as shown in FIG. 9, the threshold compensation module 50 includes at least one transistor. That is, the threshold compensation module can be composed of one transistor or multiple transistors. The transistor in the threshold compensation module can be an N-type transistor or a P-type transistor.

Figure 10:
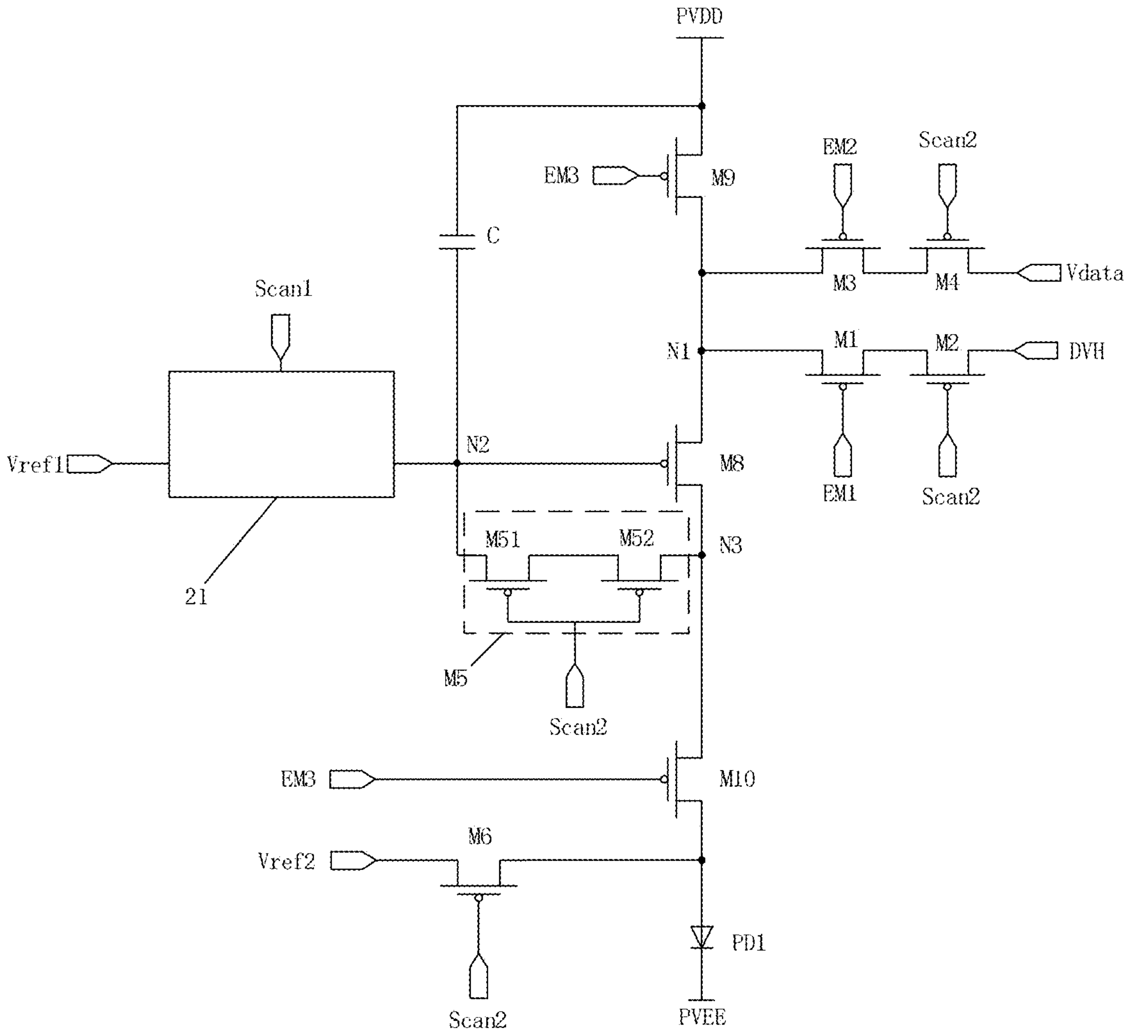
FIG. 10 shows a schematic structural diagram of another pixel driving circuit provided in an embodiment of the present application.

In some embodiments, as shown in FIG. 10, the threshold compensation module 50 includes: a first dual-gate transistor M5, the first electrode of the first dual-gate transistor M5 is electrically connected to the third end of the driving module 10, the second electrode of the first dual-gate transistor M5 is electrically connected to the second node N2, and the gate of the first dual-gate transistor M5 is configured to input the first scanning signal Scan2.

The first dual-gate transistor M5 includes a first transistor M51 and a second transistor M52, and the first scanning signal Scan2 is configured to control the turn-on and turn-off of the first dual-gate transistor M5. In the present embodiment, the first transistor M51 and the second transistor M52 can both be P-type transistors, that is, when the first scanning signal Scan2 is a low-level signal, the first dual-gate transistor M5 is turned on, and when the first scanning signal Scan2 is a high-level signal, the first dual-gate transistor M5 is turned off. As shown in FIG. 10 and FIG. 12, in the bias stage of the pixel driving circuit, when the second scanning signal Scan1 is a high-level signal and the first scanning signal Scan2 is a low-level signal, the signal of the third node N3 is virtually written into the second node N2 through the first dual-gate transistor M5 to perform threshold compensation on the driving module. In the data writing stage, the second scanning signal Scan1 is a high-level signal, the first scanning signal Scan2 is a low-level signal, and the second data writing control signal EM2 is a low-level signal. The data signal Vdata is written into the first node N1 through the fourth data writing transistor M4 and the third data writing transistor M3, and the signal of the third node N3 is written into the second node N2 through the first dual-gate transistor M5 to realize the writing of the real data signal Vdata required for the pixel to emit light.

In some embodiments, as shown in FIG. 10, the reset module 20 includes: a reset submodule 21, wherein the first end of the reset submodule 21 is configured to input the first reset signal Vref1, the second end of the reset submodule 21 is configured to input the second scanning signal Scan1, and the third end of the reset submodule 21 is electrically connected to the second node N2; and a reset transistor M6, wherein the first electrode of the reset transistor M6 is configured to input the second reset signal Vref2, the gate of the reset transistor M6 is configured to input the first scanning signal Scan2, and the second electrode of the reset transistor M6 is configured to be electrically connected to the anode of the light-emitting element PD1.

The reset submodule is configured to transmit the first reset signal Vref1 to the second node N2 under the control of the second scanning signal Scan1 to reset the second node N2. The reset transistor M6 is configured to transmit the second reset signal Vref2 to the anode of the light-emitting element PD1 under the control of the first scanning signal Scan2 to reset the anode of the light-emitting element PD1.

In the above embodiments, taking the reset transistor M6 being a P-type transistor as an example, and the first scanning signal Scan2 is configured to control the turn-on and turn-off of the reset transistor M6. When the reset transistor M6 is a P-type transistor, the reset transistor M6 is turned off when the first scanning signal Scan2 is a high-level signal, and the reset transistor M6 is turned on when the first scanning signal Scan2 is a low-level signal.

In the reset stage of the pixel driving circuit, the first scanning signal Scan2 is a low-level signal, the reset transistor M6 is turned on, and the second reset signal Vref2 is transmitted to the anode of the light-emitting element PD1 through the reset transistor M6 to reset the anode of the light-emitting element PD1.

In some embodiments, as shown in FIG. 10, the reset submodule 21 includes at least one transistor. That is, the reset submodule 21 can be composed of one transistor or multiple transistors. The transistor in the reset submodule 21 can be an N-type transistor or a P-type transistor.

Figure 11:
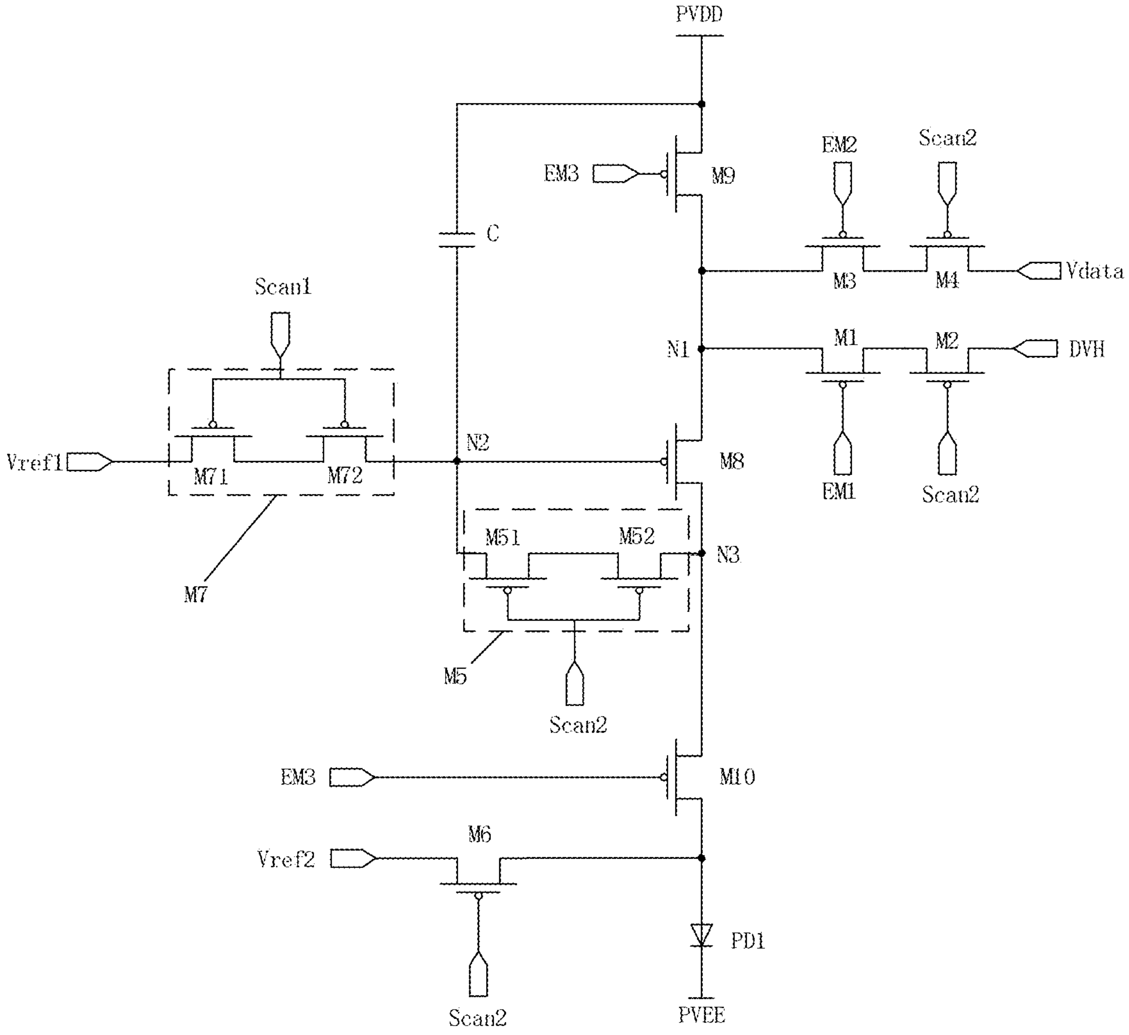
FIG. 11 shows a schematic structural diagram of another pixel driving circuit provided in an embodiment of the present application.

In some embodiments, as shown in FIG. 11, the reset submodule 21 includes: a second dual-gate transistor M7, a first electrode of the second dual-gate transistor M7 is configured to input the first reset signal, a gate of the second dual-gate transistor M7 is configured to input the second scanning signal Scan1, and a third electrode of the second dual-gate transistor M7 is electrically connected to the second node N2. The second dual-gate transistor M7 includes a third transistor M71 and a fourth transistor M72, and the second scanning signal Scan1 is configured to control the turn-on and turn-off of the second dual-gate transistor M7. In the present embodiment, taking the third transistor M71 and the fourth transistor M72 being both P-type transistors as an example, that is, when the second scanning signal Scan1 is a low-level signal, the second dual-gate transistor M7 is turned on, and when the second scanning signal Scan1 is a high-level signal, the second dual-gate transistor M7 is turned off. In the reset stage of the pixel driving circuit, when the second scanning signal Scan1 is a low-level signal, the third transistor M71 and the fourth transistor M72 are turned on, and the first reset signal Vref1 is transmitted to the second node N2 through the third transistor M71 and the fourth transistor M72 to reset the second node N2.

In some embodiments, as shown in FIG. 11, the driving module 10 includes: a driving transistor M8, the gate of the driving transistor M8 is electrically connected to the second node N2, the first electrode of the driving transistor M8 is electrically connected to the first node N1, and the second electrode of the driving transistor M8 is electrically connected to the light-emitting control module 40.

The signal of the second node N2 is configured to control the turn-on or turn-off of the driving transistor M8. In the light-emitting stage of the pixel driving circuit, the signal of the second node N2 controls the driving transistor M8 to be turned on, the light-emitting control signal EM3 controls the first light-emitting control transistor M9 and the second light-emitting control transistor M10 to be turned on, and the signal of the first driving power line PVDD is transmitted to the anode of the light-emitting element PD1 through the first light-emitting control transistor M9, the driving transistor M8 and the second light-emitting control transistor M10, and the light-emitting element PD1 emits light.

In some embodiments, as shown in FIG. 11, the light-emitting control module 40 includes: a first light-emitting control transistor M9, wherein a first electrode of the first light-emitting control transistor M9 is electrically connected to the first driving power line PVDD, a gate of the first light-emitting control transistor M9 is configured to input the light-emitting control signal EM3, and a second electrode of the first light-emitting control transistor M9 is electrically connected to the first node N1; and a second light-emitting control transistor M10, wherein a first electrode of the second light-emitting control transistor M10 is electrically connected to the third end of the driving module 10, a gate of the second light-emitting control transistor M10 is configured to input the light-emitting control signal EM3, and a second electrode of the second light-emitting control transistor M10 is electrically connected to the anode of the light-emitting element PD1.

The light-emitting control signal EM3 is configured to control the turn-on and turn-off of the first light-emitting control transistor M9 and the second light-emitting control transistor M10. Taking the first light-emitting control transistor M9 and the second light-emitting control transistor M10 being both P-type transistors as an example, when the light-emitting control signal EM3 is a high-level signal, the first light-emitting control transistor M9 and the second light-emitting control transistor M10 are turned off, and when the light-emitting control signal EM3 is a low-level signal, the first light-emitting control transistor M9 and the second light-emitting control transistor M10 are turned on.

In the light-emitting stage of the pixel driving circuit, the light-emitting control signal EM3 is a low-level signal, the first light-emitting control transistor M9 and the second light-emitting control transistor M10 are turned on, and the signal of the first driving power line PVDD is transmitted to the anode of the light-emitting element PD1 through the first light-emitting control transistor M9, the driving transistor M8 and the second light-emitting control transistor M10 to control the light-emitting element PD1 to emit light.

In some embodiments, as shown in FIG. 11, the pixel driving circuit further includes: a storage capacitor C, the first electrode of the storage capacitor C is electrically connected to the first driving power line PVDD, and the second electrode of the storage capacitor C is electrically connected to the second node N2.

The storage capacitor C is configured to keep the voltage of the second node N2 unchanged during the image frame period.

It should be noted that in a specific implementation, the first electrode of the transistor can be used as its source and the second electrode as its drain according to the type of transistor and the signal of its gate; or, conversely, the first electrode of the transistor can be used as its drain and the second electrode can be used as its source, and no specific distinction is made here.

It should be noted that, generally, transistors are divided into N-type transistors and P-type transistors. Although P-type transistors are used as examples in the above embodiments, N-type transistors can also be selected in the above embodiments, wherein the N-type transistor is turned on under the control of a high-level signal and turned off under the control of a low-level signal; the P-type transistor is turned on under the control of a low-level signal and turned off under the control of a high-level signal.

The embodiments of the present application also provide a control method for the driving circuit, and FIG. 14 is a flowchart of a control method for the pixel driving circuit according to an embodiment of the present application. As shown in FIG. 14 and FIG. 7, the above-mentioned control method is used to control any one of the above-mentioned pixel driving circuits, and the method includes S101.

In S101, when the pixel driving circuit is in the bias stage, the light-emitting control module 40 and the second data writing unit 32 are controlled to be turned off, and the first data writing unit 31 is controlled to be turned on to write the predetermined amplitude voltage signal into the first node N1. After the predetermined amplitude voltage signal is written into the first node N1, the first data writing unit 31 is controlled to be turned off and the second data writing unit 32 is controlled to be turned on, so as to control the pixel driving circuit to enter the data writing stage.

In the control method for the driving circuit in the present application, when the pixel driving circuit is in the bias stage, the first data writing unit is controlled to be turned on to write the predetermined amplitude voltage signal into the first node. After the predetermined amplitude voltage signal is written into the first node, the first data writing unit is controlled to be turned off and the second data writing unit is controlled to be turned on, so as to control the pixel driving circuit to enter the data writing stage, that is, all pixels are controlled to be written with the same predetermined amplitude voltage signal in the bias stage through the first data writing module and the second data writing module, so that all pixels are virtually written in the same state, thereby eliminating the light emission phenomenon occurred below the black fonts, and solving the problem of light emission occurred below the black fonts in the display panel in the related art.

In some embodiments, as shown in FIG. 7 and FIG. 12, when the pixel driving circuit is in the bias stage, the light-emitting control module 40 and the second data writing unit 32 are controlled to be turned off, and the first data writing unit 31 is controlled to be turned on to write the predetermined amplitude voltage signal to the first node N1. After the predetermined amplitude voltage signal is written to the first node N1, the first data writing unit 31 is controlled to be turned off and the second data writing unit 32 is controlled to be turned on, so as to control the pixel driving circuit to enter the data writing stage, the method includes S1011, S1012, S1013, S1014 and S1015.

In S1011, when the pixel driving circuit is in the reset stage, the first data writing unit 31, the second data writing unit 32 and the light-emitting control module 40 are controlled to be turned off, and the reset module 20 is controlled to be turned on, so as to reset the second node N2 for the first time.

In S1012, after the second node N2 is reset for the first time, the second data writing unit 32, the light-emitting control module 40 and the reset module 20 are controlled to be turned off, and the first data writing unit 31 is controlled to be turned on to write the predetermined amplitude voltage signal into the first node N1, so as to perform the virtual writing to the first node N1 for the first time.

In S1013, after performing the virtual writing to the first node N1 for the first time, the first data writing unit 31, the second data writing unit 32 and the light-emitting control module 40 are controlled to be turned off, and the reset module 20 is controlled to be turned on, so as to reset the second node N2 for the second time.

In S1014, after the second node N2 is reset for the second time, the second data writing unit 32, the light-emitting control module 40 and the reset module 20 are controlled to be turned off, and the first data writing unit 31 is controlled to be turned on to write the predetermined amplitude voltage signal to the first node N1 again, so as to perform the virtual writing to the first node N1 for the second time.

In S1015, after the virtual writing is performed to the first node N1 for the second time, the pixel driving circuit is controlled to enter the data writing stage.

The above steps make the writing states of the first two pulses of all pixels the same in the three-pulse writing of the pixel driving circuit, so that the negative bias states of the transistor are the same, so the light emission phenomenon occurred below the black fonts can be eliminated.

The working process of the pixel driving circuit provided by the embodiments of the present application is described by taking the display panel shown in FIG. 11 as an example in conjunction with the circuit timing sequence diagram shown in FIG. 12 below. In the following description, 1 represents a high level and 0 represents a low level. It should be noted that 1 and 0 are logic potentials, which are only used to better explain the specific working process of the embodiments of the present application, rather than specific voltage values.

In some optional embodiments, the working process of the pixel circuit includes a reset stage, a data writing stage and a light-emitting stage. The reset stage also includes a bias stage, which is used for virtual writing of data, and the data writing stage is between the reset stage and the light-emitting stage.

During stage t1 (i.e., the reset stage), EM1=0, EM2=1, and the light-emitting control signal EM3 first becomes a high level, i.e., EM3=1, and then controls Scan1=0.

The light-emitting control signal EM3 controls the first light-emitting control transistor M9 and the second light-emitting control transistor M10 to be turned off, and the second data writing control signal EM2 controls the third data writing transistor M3 to be turned off.

The first scanning signal Scan2 first controls the second data writing transistor M2, the fourth data writing transistor M4 and the first double-gate transistor M5 to be turned off.

The second scanning signal Scan1 controls the third transistor M71 and the fourth transistor M72 of the second double-gate transistor M7 to be turned on, and the first reset signal Vref1 is transmitted to the second node N2 through the third transistor M71 and the fourth transistor M72 to reset the second node N2 for the first time.

Afterwards, in the bias stage (i.e., stage t4), the second scanning signal Scan1 becomes high potential, the first scanning signal Scan2 becomes low potential, the first scanning signal Scan2 controls the second data writing transistor M2 and the first dual-gate transistor M5 to be turned on, and since EM1=0, the first data writing transistor M1 is turned on, and at this time, the predetermined amplitude voltage signal DVH is transmitted to the first node N1 through the second data writing transistor M2 and the first data writing transistor M1, so as to perform the virtual writing to the first node N1 for the first time. At the same time, the first scanning signal Scan2 controls the reset transistor M6 to be turned on, and the second reset signal Vref2 is transmitted to the anode of the light-emitting element PD1 through the reset transistor M6 to reset the anode of the light-emitting element PD1 for the first time.

After that, the first scanning signal Scan2 becomes high potential, controlling the second data writing transistor M2, the fourth data writing transistor M4 and the first dual-gate transistor M5 to be turned off, the second scanning signal Scan1 becomes low potential, controlling the third transistor M71 and the fourth transistor M72 of the second dual-gate transistor M7 to be turned on, and the first reset signal Vref1 is transmitted to the second node N2 through the third transistor M71 and the fourth transistor M72 to reset the second node N2 for the second time.

After another bias stage (i.e., stage t4), the second scanning signal Scan1 becomes high potential, the first scanning signal Scan2 becomes low potential, the first scanning signal Scan2 controls the second data writing transistor M2 and the first dual-gate transistor M5 to be turned on, and the predetermined amplitude voltage signal DVH is transmitted to the first node N1 through the second data writing transistor M2 and the first data writing transistor M1, so as to perform the virtual writing on the first node N1 for the second time. At the same time, the first scanning signal Scan2 controls the reset transistor M6 to be turned on, and the second reset signal Vref2 is transmitted to the anode of the light-emitting element PD1 through the reset transistor M6 to reset the anode of the light-emitting element PD1 for the second time.

During stage t2 (i.e., the data writing stage), EM1=1, EM2=0, and EM3=1.

The second scanning signal Scan1 changes from a low level to a high level, controlling the third transistor M71 and the fourth transistor M72 of the second dual-gate transistor M7 to be turned off, and the light-emitting control signal EM3 controls the first light-emitting control transistor M9 and the second light-emitting control transistor M10 to be turned off. The first scanning signal Scan2 changes from a high level to a low level, controlling the second data writing transistor M2, the fourth data writing transistor M4 and the first dual-gate transistor M5 to be turned on, and the data signal Vdata is transmitted to the first node N1 through the fourth data writing transistor M4 and the second data writing transistor M2. At this time, the voltage of the first node N1 is equal to the data signal Vdata, and the signal of the first node N1 is transmitted to the third node N3 through the driving transistor M8. At this time, the voltage of the third node N3 is the difference value between the voltage of the data signal line Vdata and the threshold voltage of the driving transistor M8, that is, $V_{N3}=Vdata-|V_{th}|$.

The first scanning signal Scan2 controls the first transistor M51 and the second transistor M52 of the first dual-gate transistor M5 to be turned on, and the signal of the third node N3 is transmitted to the second node N2 through the first transistor M51 and the second transistor M52. In this process, the voltage of the second node N2 slowly increases.

During stage t3 (i.e., the light-emitting stage), Scan1=1, Scan2=1, EM3=0, EM2=0.

The second scanning signal Scan1 controls the third transistor M71 and the fourth transistor M72 of the second dual-gate transistor M7 to be turned off, and the first scanning signal Scan2 controls the first dual-gate transistor M5, the second data writing transistor M2, the fourth data writing transistor M4 and the reset transistor M6 to be turned off. The light-emitting control signal EM3 controls the first light-emitting control transistor M9 and the second light-emitting control transistor M10 to be turned on, and the signal of the second node N2 controls the driving transistor M8 to be turned on. The signal of the first driving power supply PVDD is transmitted to the anode of the light-emitting element PD1 through the first light-emitting control transistor M9, the driving transistor M8 and the second light-emitting control transistor M10, so that the light-emitting element PD1 emits light.

Figure 15:
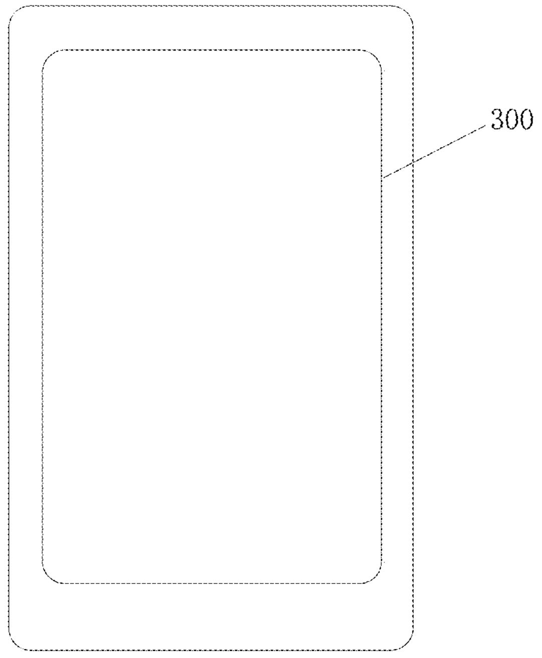
FIG. 15 shows a schematic structural diagram of a display panel provided in an embodiment of the present application.

Based on the same inventive concept, an embodiment of the present application also provides a display panel, as shown in FIG. 15, the display panel 300 includes: a display area and any one of the above-mentioned pixel driving circuits.

In the above-mentioned display panel of the present application, all pixels are written with the same predetermined amplitude voltage signal in the bias stage, so that all pixels have the same virtual writing state, thereby eliminating the light emission phenomenon occurred below the black fonts, and solving the problem of light emission occurred below the black fonts in the display panel in the related art.

In the specific implementation, in the implementation of the present application, a display apparatus is also provided, and the display apparatus includes a display panel. The display apparatus provided in the present embodiment can be an array substrate, or a terminal display apparatus, such as a mobile phone, a computer, a television, or other display apparatus with display functions, which is not specifically limited in the present application. The display apparatus provided in the embodiments of the present application has the beneficial effects of the pixel driving circuit provided in the embodiments of the present application, which refers to the various embodiments in details. The specific description of the gate driving circuit is not repeated in the present embodiment.

It should also be noted that the terms "include", "comprises" or any other variants thereof are intended to cover non-exclusive inclusion, so that a process, method, commodity or device including a series of elements includes not only those elements, but also other elements not explicitly listed, or also includes elements inherent to such process, method, commodity or device. In the absence of further restrictions, the elements defined by the sentence "includes one . . . " do not exclude the existence of other identical elements in the process, method, commodity or device including the elements.

From the above description, it can be seen that the above embodiments of the present application achieve the following technical effects.

1) The above pixel driving circuit of the present application includes a driving module, a reset module, a data writing module and a light-emitting control module, wherein the data writing module is connected to the first end of the driving module at a first node, the data writing module includes a first data writing unit and a second data writing unit, the first data writing unit is configured to write a predetermined amplitude voltage signal to the first node in the bias stage, and the second data writing unit is configured to write a data signal to the first node in the data writing stage; the second end of the driving module is connected to the reset module at the second node. The pixel driving circuit controls all pixels to be written with the same predetermined amplitude voltage signal in the bias stage through the first data writing module and the second data writing module, so that all pixels are in the same virtual writing state, thereby eliminating the light emission phenomenon occurred below the black fonts, and solving the problem of light emission occurred below the black fonts in the display panel in the related art.

2) In the above-mentioned control method for the driving circuit of the present application, when the pixel driving circuit is in the bias stage, the first data writing unit is controlled to be turned on to write the predetermined amplitude voltage signal to the first node, and after the predetermined amplitude voltage signal is written to the first node, the first data writing unit is controlled to be turned off and the second data writing unit is controlled to be turned on, so as to control the pixel driving circuit to enter the data writing stage, that is, all pixels are controlled to be written with the same predetermined amplitude voltage signal in the bias stage through the first data writing module and the second data writing module, so that all pixels are in the same virtual writing state, thereby eliminating the light emission phenomenon occurred below the black fonts, and solving the problem of light emission occurred below the black fonts in the display panel in the related art.

3) All pixels in the above-mentioned display panel of the present application are written with the same predetermined amplitude voltage signal in the bias stage, so that all pixels are in the same virtual writing state, thereby eliminating the light emission phenomenon occurred below the black fonts, and solving the problem of light emission occurred below the black fonts in the display panel in the related art.

The above are only preferred embodiments of the present application and are not intended to limit the present application. For those skilled in the art, the present application may have various changes and variations. Any modifications, equivalent substitutions, improvements, etc. made within the gist and principles of the present application shall be included in the protection scope of the present application.

What is claimed is:

1. A pixel driving circuit, comprising a driving module, a reset module, a data writing module and a light-emitting control module, the data writing module being connected to a first end of the driving module at a first node, the data writing module comprising a first data writing unit and a second data writing unit, the first data writing unit being configured to write a predetermined amplitude voltage signal to the first node in a bias stage, and the second data writing unit being configured to write a data signal to the first node in a data writing stage;

a second end of the driving module being connected to the reset module at a second node, and the reset module being configured to reset the second node and an anode of the light-emitting element, wherein the pixel driving circuit is configured to in a case that the pixel driving circuit is in the reset stage, control the first data writing unit, the second data writing unit and the light-emitting control module to be turned off, and control the reset module to be turned on to reset the second node for a first time;

after the second node is reset for the first time, control the second data writing unit, the light-emitting control module and the reset module to be turned off, and control the first data writing unit to be turned on to write the predetermined amplitude voltage signal into the first node, so as to perform a virtual writing on the first node for the first time;

after the virtual writing is performed on the first node for the first time, control the first data writing unit, the second data writing unit and the light-emitting control module to be turned off, and control the reset module to be turned on to reset the second node for a second time;

after the second node is reset for the second time, control the second data writing unit, the light-emitting control module and the reset module to be turned off, and control the first data writing unit to be turned on to write the predetermined amplitude voltage signal to the first node again, so as to perform the virtual writing on the first node for the second time;

after the virtual writing is performed on the first node for the second time, control the pixel driving circuit to enter the data writing stage.

2. The pixel driving circuit according to claim 1, wherein the first data writing unit comprises:

a first data writing transistor, wherein a first electrode of the first data writing transistor is electrically connected to the first node, and a gate of the first data writing transistor is configured to input a first data writing control signal;

a second data writing transistor, wherein a first electrode of the second data writing transistor is electrically connected to a second electrode of the first data writing transistor, a gate of the second data writing transistor is configured to input a first scanning signal, and a second electrode of the second data writing transistor is configured to input the predetermined amplitude voltage signal.

3. The pixel driving circuit according to claim 1, wherein the second data writing unit comprises:

a third data writing transistor, wherein a first electrode of the third data writing transistor is electrically connected to the first node, and a gate of the third data writing transistor is configured to input a second data writing control signal;

a fourth data writing transistor, wherein a first electrode of the fourth data writing transistor is electrically connected to a second electrode of the third data writing transistor, a gate of the fourth data writing transistor is configured to input a first scanning signal, and a second electrode of the fourth data writing transistor is configured to input the data signal.

4. The pixel driving circuit according to claim 1, further comprising:

a threshold compensation module, wherein a first end of the threshold compensation module is electrically connected to a third end of the driving module, a second end of the threshold compensation module is electrically connected to the second node, and a third end of the threshold compensation module is configured to input a first scanning signal.

5. The pixel driving circuit according to claim 4, wherein the threshold compensation module comprises at least one transistor.

6. The pixel driving circuit according to claim 4, wherein the threshold compensation module comprises:

a first dual-gate transistor, a first electrode of the first dual-gate transistor is electrically connected to the third end of the driving module, a second electrode of the first dual-gate transistor is electrically connected to the second node, and a gate of the first dual-gate transistor is configured to input the first scanning signal.

7. The pixel driving circuit according to claim 1, wherein the reset module comprises:

a reset submodule, a first end of the reset submodule is configured to input a first reset signal, a second end of the reset submodule is configured to input a second scanning signal, and a third end of the reset submodule is electrically connected to the second node;

a reset transistor, a first electrode of the reset transistor is configured to input a second reset signal, a gate of the reset transistor is configured to input a first scanning signal, and a second electrode of the reset transistor is configured to be electrically connected to the anode of the light-emitting element.

8. The pixel driving circuit according to claim 7, wherein the reset submodule comprises at least one transistor.

9. The pixel driving circuit according to claim 7, wherein the reset submodule comprises:

a second dual-gate transistor, a first electrode of the second dual-gate transistor is configured to input the first reset signal, a gate of the second dual-gate transistor is configured to input the second scanning signal, and a third electrode of the second dual-gate transistor is electrically connected to the second node.

10. The pixel driving circuit according to claim 1, wherein the driving module comprises:

a driving transistor, a gate of the driving transistor is electrically connected to the second node, a first electrode of the driving transistor is electrically connected to the first node, and a second electrode of the driving transistor is electrically connected to the light-emitting control module.

11. The pixel driving circuit according to claim 1, wherein the light-emitting control module comprises:

a first light-emitting control transistor, a first electrode of the first light-emitting control transistor is electrically connected to a first driving power line, a gate of the first light-emitting control transistor is configured to input a light-emitting control signal, and a second electrode of the first light-emitting control transistor is electrically connected to the first node;

a second light-emitting control transistor, a first electrode of the second light-emitting control transistor is electrically connected to a third end of the driving module, a gate of the second light-emitting control transistor is configured to input the light-emitting control signal, and a second electrode of the second light-emitting control transistor is electrically connected to the anode of the light-emitting element.

12. The pixel driving circuit according to claim 1, wherein the pixel driving circuit further comprises:

a storage capacitor, a first electrode of the storage capacitor is electrically connected to a first driving power line, and a second electrode of the storage capacitor is electrically connected to the second node.

13. A control method for a pixel driving circuit, wherein the control method is configured to control the pixel driving circuit comprising a driving module, a reset module, a data writing module and a light-emitting control module, the data writing module being connected to a first end of the driving module at a first node, the data writing module comprising a first data writing unit and a second data writing unit, the first data writing unit being configured to write a predetermined amplitude voltage signal to the first node in a bias stage, and the second data writing unit being configured to write a data signal to the first node in a data writing stage; a second end of the driving module being connected to the reset module at a second node, and the reset module being configured to reset the second node and an anode of the light-emitting element, and the method comprises:

in a case that the pixel driving circuit is in the bias stage, controlling the light-emitting control module and the second data writing unit to be turned off, and controlling the first data writing unit to be turned on to write the predetermined amplitude voltage signal to the first node, and after writing the predetermined amplitude voltage signal to the first node, controlling the first data writing unit to be turned off and the second data writing unit to be turned on, so as to control the pixel driving circuit to enter the data writing stage, wherein in a case that the pixel driving circuit is in the bias stage, the controlling the light-emitting control module and the second data writing unit to be turned off, and the controlling the first data writing unit to be turned on to write the predetermined amplitude voltage signal to the first node, and after writing the predetermined amplitude voltage signal to the first node, the controlling the first data writing unit to be turned off and the second data writing unit to be turned on, so as to control the pixel driving circuit to enter the data writing stage, comprising:

in a case that the pixel driving circuit is in the reset stage, controlling the first data writing unit, the second data writing unit and the light-emitting control module to be turned off, and controlling the reset module to be turned on to reset the second node for a first time;

after the second node is reset for the first time, controlling the second data writing unit, the light-emitting control module and the reset module to be turned off, and controlling the first data writing unit to be turned on to write the predetermined amplitude voltage signal into the first node, so as to perform a virtual writing on the first node for the first time;

after the virtual writing is performed on the first node for the first time, controlling the first data writing unit, the second data writing unit and the light-emitting control module to be turned off, and controlling the reset module to be turned on to reset the second node for a second time;

after the second node is reset for the second time, controlling the second data writing unit, the light-emitting control module and the reset module to be turned off, and controlling the first data writing unit to be turned on to write the predetermined amplitude voltage signal to the first node again, so as to perform the virtual writing on the first node for the second time;

after the virtual writing is performed on the first node for the second time, controlling the pixel driving circuit to enter the data writing stage.

14. A display panel, comprising: a pixel driving circuit comprising a driving module, a reset module, a data writing module and a light-emitting control module, the data writing module being connected to a first end of the driving module at a first node, the data writing module comprising a first data writing unit and a second data writing unit, the first data writing unit being configured to write a predetermined amplitude voltage signal to the first node in a bias stage, and the second data writing unit being configured to write a data signal to the first node in a data writing stage; a second end of the driving module being connected to the reset module at a second node, and the reset module being configured to reset the second node and an anode of the light-emitting element, wherein the pixel driving circuit is configured to in a case that the pixel driving circuit is in the reset stage, control the first data writing unit, the second data writing unit and the light-emitting control module to be turned off, and control the reset module to be turned on to reset the second node for a first time;

after the second node is reset for the first time, control the second data writing unit, the light-emitting control module and the reset module to be turned off, and control the first data writing unit to be turned on to write the predetermined amplitude voltage signal into the first node, so as to perform a virtual writing on the first node for the first time;

after the virtual writing is performed on the first node for the first time, control the first data writing unit, the second data writing unit and the light-emitting control module to be turned off, and control the reset module to be turned on to reset the second node for a second time;

after the second node is reset for the second time, control the second data writing unit, the light-emitting control module and the reset module to be turned off, and control the first data writing unit to be turned on to write the predetermined amplitude voltage signal to the first node again, so as to perform the virtual writing on the first node for the second time;

after the virtual writing is performed on the first node for the second time, control the pixel driving circuit to enter the data writing stage.

* * * * *